US009013286B2

(12) United States Patent
Chen et al.

(10) Patent No.: US 9,013,286 B2
(45) Date of Patent: Apr. 21, 2015

(54) DRIVER ASSISTANCE SYSTEM FOR DISPLAYING SURROUNDINGS OF A VEHICLE

(71) Applicants: Volkswagen AG, Wolfsburg (DE); Audi AG, Ingolstadt (DE)

(72) Inventors: Henry Chen, Mountain View, CA (US); Anh Vu, Moreno Valley, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 14/033,586

(22) Filed: Sep. 23, 2013

(65) Prior Publication Data
US 2015/0084755 A1   Mar. 26, 2015

(51) Int. Cl.
*B60Q 1/00* (2006.01)
*G08G 1/16* (2006.01)

(52) U.S. Cl.
CPC ........................................ *G08G 1/16* (2013.01)

(58) Field of Classification Search
USPC .............. 340/435–437, 425.5, 995.1, 995.12, 340/995.13, 995.15, 996.175, 340/995.23–995.27; 348/148; 382/276, 382/282; 701/1, 300, 301
See application file for complete search history.

(56) References Cited

U.S. PATENT DOCUMENTS

| 8,130,271 B2 * | 3/2012 | Imamura | 348/148 |
| 8,319,618 B2 * | 11/2012 | Gomi et al. | 340/435 |
| 8,531,281 B2 * | 9/2013 | Stahlin et al. | 340/435 |
| 8,624,716 B2 * | 1/2014 | Englander | 340/433 |
| 8,736,458 B2 * | 5/2014 | Reynolds et al. | 340/666 |
| 2008/0198226 A1 * | 8/2008 | Imamura | 348/148 |
| 2009/0015675 A1 * | 1/2009 | Yang | 348/148 |
| 2013/0107052 A1 * | 5/2013 | Gloger et al. | 348/148 |

FOREIGN PATENT DOCUMENTS

DE    102008036009 A1    10/2009
WO      2012116350 A2     8/2012

OTHER PUBLICATIONS

Auclair et al.; A Robust Approach for 3D Cars Reconstruction; SCIA'07 Proceedings of the 15th Scandinavian Conference on Image Analysis; 2007; pp. 183-192; Springer-Verlag Berlin; ISBN: 978-3-540-73039-2.

(Continued)

*Primary Examiner* — George Bugg
*Assistant Examiner* — Edny Labbees
(74) *Attorney, Agent, or Firm* — Barnes & Thornburg LLP

(57) ABSTRACT

A driver assistance system is configured to display on a vehicle display an image of corresponding surroundings of a vehicle, having at least one image capturing camera; a viewpoint converter to generate a viewpoint converted image having a point of view looking downwardly from above the vehicle; at least one sensor configured to detect a distance or a partial shape of at least one object in surroundings of the vehicle; an image processor configured to modify the viewpoint converted image based on the detected distance or the partial shape of the at least one object looking from the vehicle to the at least one object, wherein the modification of the viewpoint converted image includes enhancing the three dimensional appearance of the at least one object in the viewpoint converted image.

17 Claims, 5 Drawing Sheets

(56) References Cited

OTHER PUBLICATIONS

Wefelscheid et al.; Three-Dimensional Building Reconstruction Using Images Obtained by Unmanned Aerial Vehicles; International Archives of the Photogrammetry, Remote Sensing and Spatial Information Sciences; vol. XXXVIII-1/C22; UAV-g 2011; Conference on Unmanned Aerial Vehicle in Geomatics; Zurich, Switzerland.

* cited by examiner

DRIVER ASSISTANCE SYSTEM FOR DISPLAYING SURROUNDINGS OF A VEHICLE

BACKGROUND

The present disclosure relates to a driver assistance system for displaying surroundings of a vehicle. More specifically, the present disclosure is directed to display the surroundings of a vehicle from a viewpoint above the vehicle.

There are vehicle display systems available that show a birds-eye-view of surroundings of the vehicle during a parking situation. The image presented to the driver is a reconstructed image from exterior cameras. Cameras are placed, for example, in the front, in the side view mirrors and the rear of the vehicle. The reconstruction image processing algorithm usually assumes all objects are lying flat on the ground. This method causes distortion to images that are above ground level. Vehicles parked adjacent to the vehicle equipped with a birds-eye- or top-view camera system appear very distorted in the displayed image. This distortion can make it very hard for the driver to be able to clearly identify an object in the displayed image. Even if he is able to recognize a possible object in the image he might be unable to identify the dimensions of the object, the correct distance or the shape of the object. The value and acceptance of using a top-view-camera system in a vehicle is therefore negatively affected.

SUMMARY

According to the present disclosure, a driver assistance system is provided and configured to display on a vehicle display an image of corresponding surroundings of a vehicle. At least one camera may capture images of surroundings of a vehicle. The driver assistance system may further comprises a viewpoint converter, which may be configured to perform viewpoint conversion of the images to generate a viewpoint converted image having a point of view looking downwardly from above the vehicle. At least one sensor may be configured to measure a distance and a shape of partial shape of at least one object in surroundings of the vehicle. An image processor may be configured to modify the viewpoint converted image based on the detected distance and the partial shape of the at least one object looking from the vehicle to the at least one object.

The modification of the viewpoint converted image may include enhancing the three dimensional appearance of the at least one object in the viewpoint converted image. As a result, the driver may now be able to get a better overview of the surroundings of the vehicle. By enhancing the three dimensional appearance of the viewpoint converted image, the distance and shape information of objects may be included visually in the image. Accordingly, a viewer of the displayed image can easily get an impression of the location of objects around the vehicle more quickly. The enhanced image, therefore, may improve the safety while using the suggested driver assistance system.

BRIEF DESCRIPTION OF THE FIGURES

The detailed description particularly refers to the accompanying figures in which.

DETAILED DESCRIPTION

Figure 1:
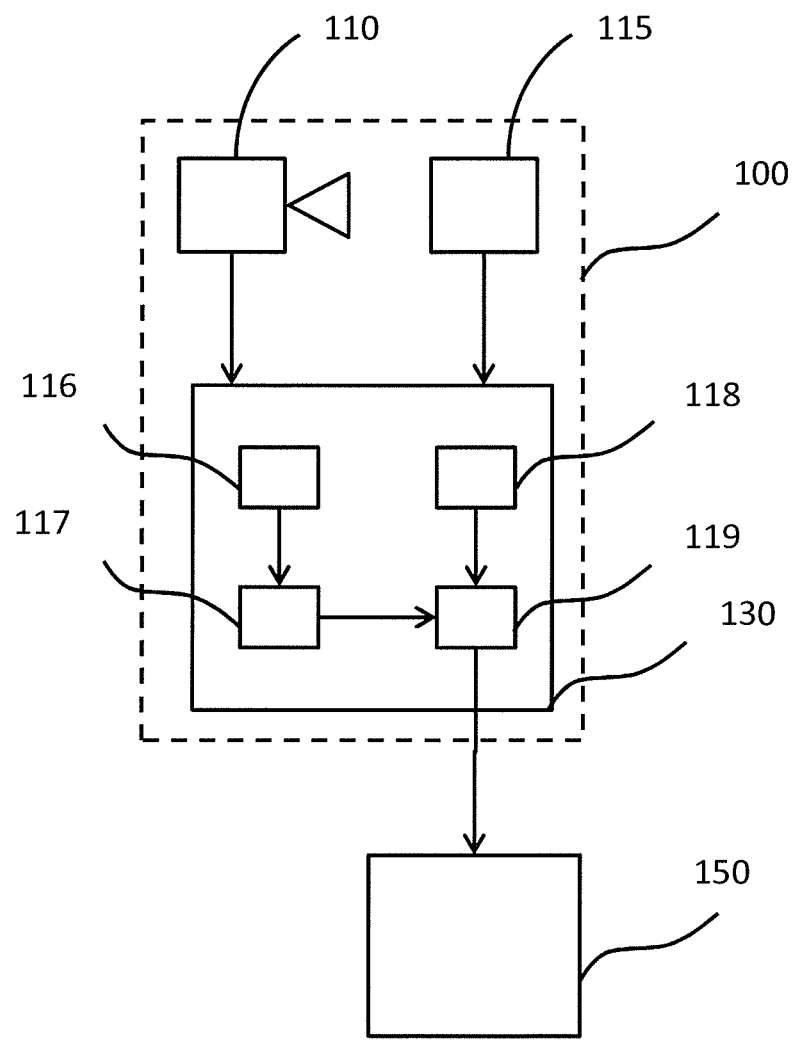
FIG. 1 shows a block diagram of a driver assistance system configured to display on a vehicle display an image of corresponding surroundings of a vehicle.

According to the present disclosure, a driver assistance system is provided and configured to display on a vehicle display an image of corresponding surroundings of a vehicle. At least one camera may capture images of surroundings of a vehicle. The driver assistance system may further comprises a viewpoint converter, which may be configured to perform viewpoint conversion of the images to generate a viewpoint converted image having a point of view looking downwardly from above the vehicle. At least one sensor may be configured to measure a distance and a shape of partial shape of at least one object in surroundings of the vehicle. An image processor may be configured to modify the viewpoint converted image based on the detected distance and the partial shape of the at least one object looking from the vehicle to the at least one object.

The modification of the viewpoint converted image may include enhancing the three dimensional appearance of the at least one object in the viewpoint converted image. As a result, the driver may now be able to get a better overview of the surroundings of the vehicle. By enhancing the three dimensional appearance of the viewpoint converted image, the distance and shape information of objects may be included visually in the image. Accordingly, a viewer of the displayed image can easily get an impression of the location of objects around the vehicle more quickly. The enhanced image, therefore, may improve the safety while using the suggested driver assistance system.

In one embodiment, the system is configured to highlight the detected object if the detected distance is below a predefined threshold value. For example, the additional highlighting points out to the driver, that a specific object is close to the vehicle and, depending on his driving path intention, he needs to pay additional attention to this object. A few examples of possible highlighted objects in the image include color mark a part of an object, color mark the complete detected object, display or outline the contour of the object, or display text or symbols on or next to the object.

In the parking situation, the driver usually has to pay special attention to curbs, ditches and poles. In one embodiment, the driver assistance system is therefore configured to detect and highlight curbs, ditches and pols. For example, if a curb is detected in the vicinity of the vehicle, a colored bar is displayed on or near the location of the curb if the height of the curb is below a predefined threshold height value. The colored bar can also be displayed semitransparent. If the height is above this threshold value, the bar is displayed in a different color, e.g. in red, and can additionally be displayed in a flashing or any attraction attending mode, if the distance to the curb is below a predefined distance value. In another embodiment, the vehicle is parked parallel to the curb. Since the driver assistant system has measured the distance or position and height of objects, including the curb, the display could indicate that a vehicle door, if operated to open, could collide with the curb or any other object, e.g. a pole, a trashcan, a vehicle etc., in the opening range of the vehicle door.

In another embodiment, the system is configured to highlight moving objects. This is especially valuable to the vehicle driver because he might not be aware that an object is moving or approaching his vehicle. For example, if in the situation of reverse parking a pedestrian is walking next to the vehicle, the display will highlight the moving pedestrian in the displayed image with a colored circle around the pedestrian or its contour. In another embodiment, the moving object is only highlighted, if below a predefined distance threshold value.

The driver assistance system enhances the three dimensional appearance of the viewpoint converted image by generating a three dimensional landscape of at least a section surrounding the vehicle based on the received sensor data and by mapping the viewpoint converted image on the generated three dimensional landscape. In other words, the system first creates a virtual map or surface reflecting the measured distances of objects surrounding the vehicle. Then, a mesh is created on the surface of this virtual map comprising smaller areas. The size of the areas usually depends on the curvature of the surface. The size of the areas can be equal or different. The smaller the areas in curved regions of the surface area, the better is the overall reconstruction appearance and smoothness of the surface by the individual areas. Usually, the size of the mesh areas may be adjusted dynamically dependent on the curvature of the corresponding surface areas to be covered by the mesh. Next, all image portions may be mapped into the mesh areas, considering their corresponding space orientation. This mapping of image portions into the mesh areas may also include adjusting the viewpoint of the corresponding image portions to be mapped.

In further embodiments, the at least one sensor includes a laser scanner, a radar sensor, or an ultrasonic sensor. Additionally any sensor, capable of determining a distance of an object in relation to the vehicle may be suitable for the suggested driver assistance system. All the sensors can also be used in combination in vehicle. For example, a LIDAR (a combination of a light and radar sensor) may be used in the vehicle together with ultrasonic sensors, wherein the ultrasonic sensors may be used in this example to detect closer objects, whereas the LIDAR may be used to detect object further away.

In one embodiment, the system may be configured to identify a vehicle in one captured image of the corresponding surroundings of the vehicle and to identify the brand or type of vehicle. For example, if the driver approaches a parking space between two vehicles, e.g. a Volkswagen Touareg and a Volkswagen Passat, a front view camera recognizes the Volkswagen Logo on the corresponding car and the lettering of the type of the car on the trunk: "Touareg" and "Passat". The system can now display on the detected objects a Volkswagen Logo and "Passat" or "Touareg" correspondingly.

In another embodiment, the driver assistance system has access to an onboard or offboard image database of vehicles. If a specific vehicle may be identified while approaching the parking space, the corresponding image, which could also be a graphical representation of the vehicle, may be displayed. The database contains three dimensional models of the vehicles, so that a corresponding image or the three dimensional model can be placed with correct dimensions in the viewpoint corrected image. In an example, the driver assistance system can also detect the color of the vehicle and the displayed vehicle image or model may be color matched with the detected color.

Images of adjacent vehicles may be stored in a memory in the driver's vehicle. When returning to the vehicle, the driver assistance system can perform a plausibility check, whether the parking situation next to the vehicle has changed. If for example, the color and characteristic features of the vehicle stayed the same, the stored image or parts of the stored image may be displayed again. If, for example, the color in the image of one side of the vehicle does not match with the stored vehicle image color, then the system can assume that a new vehicle has parked at this side and captures new images from this vehicle side. If the vehicle color and main characteristics in the image representing the adjacent vehicle stayed the same, then the stored information, for example, brand, type or graphical model etc., will be displayed, assuming that no different vehicle has parked at the corresponding side.

According to the present disclosure, FIG. 1 shows a block diagram of a driver assistance system 100 configured to display on a vehicle display 150 an image of corresponding surroundings of a vehicle 101. At least one camera 110-114 captures an image of the surroundings of a vehicle 101, which may be provided to an image combiner 116. In another embodiment, five cameras 110-114 may be used, which may be located, for example, in the rear, the front and the side mirrors. Because of the camera locations in the vehicle 101, the images captured might have an overlap with each other, which may be eliminated by the image combiner 116. Overlapping areas of the images may be detected and deleted enabling the image combiner 116 to generate an image of the surroundings of the vehicle 101 with no overlap.

The images may be captured from different viewpoints of the cameras 110-114 in relation to the ground. For example, the cameras 110, 111 (FIG. 2), located in the side view mirrors have a different view point in relation to the ground than the rear view camera 114 or the front cameras 112, 113. An image processor 130 comprises different image processing units or at least one unit that may be capable of processing different image processing tasks. A viewpoint converter 117 may be configured, for example, to either transform single captured images of the cameras 110-114, parts of the combined image or the complete combined image.

The vehicle 101 may also be equipped with at least one sensor 115 providing measurements of object distances around the vehicle 101. If the sensor 115 may be able to measure more than one distance point for an object, the shape or an approximation of the shape of the object can be detected or approximated. In one embodiment, a LIDAR (Light Detection and Ranging) sensor collects high resolution information of the surroundings of the vehicle 101. The different measurements may be used by the landscape generator 118 to create a virtual landscape or a surface profile of the surroundings of the vehicle 101. The virtual landscape or surface profile represents a surface based on the detected distance measurement points. The virtual landscape may be subsequently covered with a mesh 601-603 approximating the surface as seen from the vehicle 101 by the landscape generator 118.

The individual mesh areas have an orientation in space which may be determined or recognized by the image mapper 119. The image mapper 119 maps image areas of the combined image to the corresponding mesh areas. An additional viewpoint transformation operation might be necessary to adopt the image area orientation in space to the corresponding mesh area orientation in space.

The results may further be transformed to the viewpoint of the driver or to any birds-eye-viewpoint looking downward on the vehicle or any object. In one embodiment, the viewpoint may dynamically be chosen depending on the driving or object situation. The combined, mapped image may be then processed to be displayed on the vehicle display 150.

By processing the images in the described or a similar way, including a different sequence, the vehicle driver may be provided with an overview image in which the three dimensional view of surroundings may be enhanced. This enhances safety in driving, since the visual acquisition of the situation by the vehicle driver, including instantly capturing of related distances of objects, can be done easier and faster.

In one embodiment, the vehicle 101 approaches a free parking space with one adjacent vehicle parked to the left. The driver assistance system 100 emphasizes the view to the left vehicle on the vehicle display 150 by displaying the own vehicle 101 in the birds-eye-view out of center. This provides a larger area for displaying the object of interest: The vehicle to the left. By doing this, the driver assistance system 101 emphasizes the space of interest around the vehicle, which may be the space with the detected object. If the vehicle is stopped at the parking position, the viewpoint of the displayed image can be changed again, so that the vehicle 101 may be displayed in the center of the image. The driver now gets an overview of the object situation around his vehicle 101 before turning off the engine.

Figure 2:
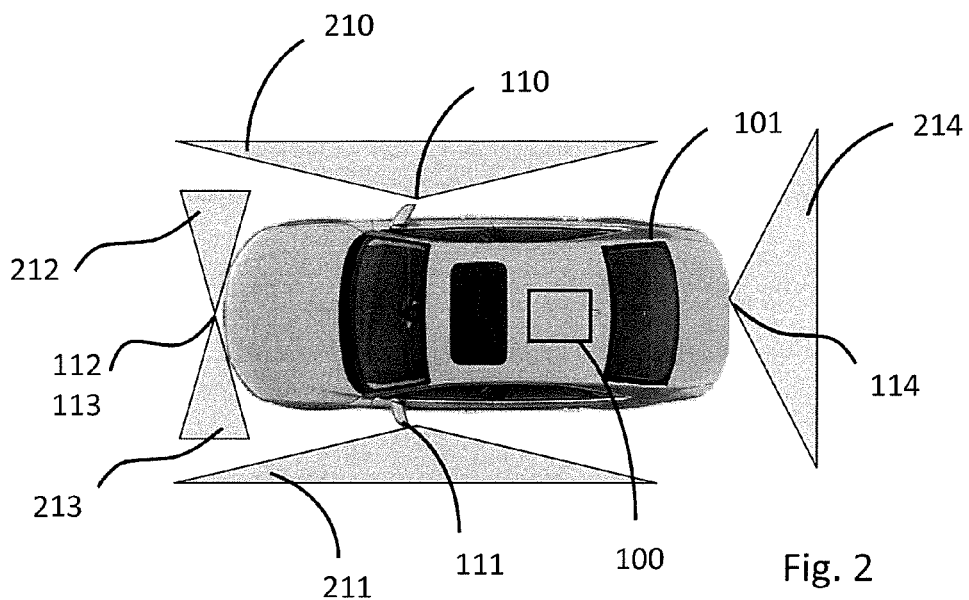
FIG. 2 shows a schematic view on a vehicle equipped with the described driver assistance system showing view areas of vehicle cameras.

FIG. 2 shows a schematic view on a vehicle 101 equipped with the inventive driver assistance system 100 showing schematic view areas 210-214 of vehicle cameras 110-114. For illustration purposes only, none of the view areas 210-214 overlap. In one embodiment, at least two view areas 210-214 of vehicle cameras 110-114 overlap. The image combiner 116 combines at least two captured images of the vehicle cameras 110-114.

Figure 3:
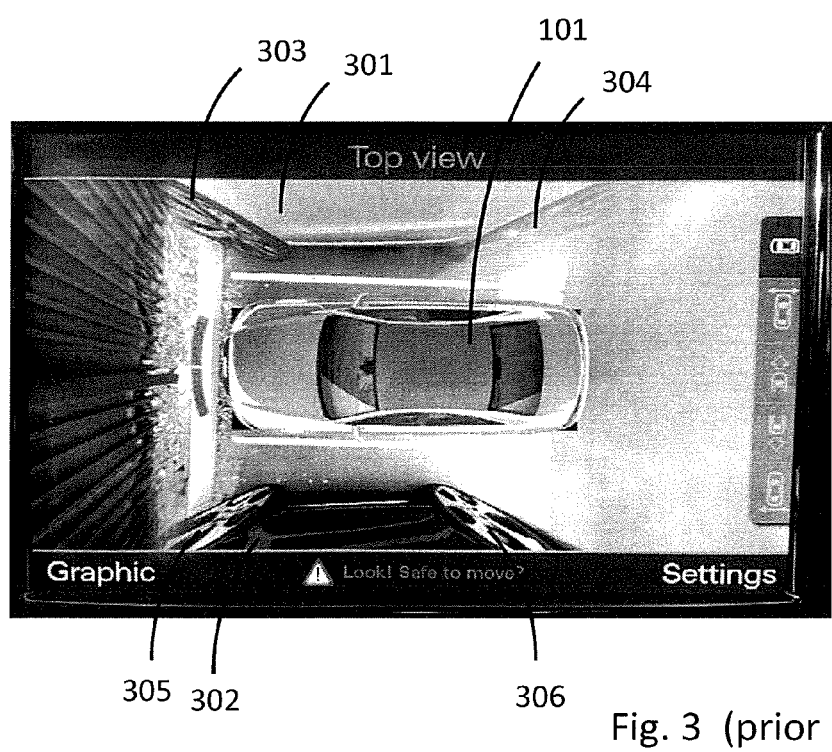
FIG. 3 shows an illustration of an exemplary birds-eye-view of a vehicle displayed on a vehicle display as known in the prior art.

FIG. 3 shows a view on a vehicle display 150 of a vehicle 101 providing a top view on the vehicle 101 as known in the prior art. The displayed image includes surrounding areas of the vehicle 101. In the image, displayed to the adjacent right and left side of the vehicle 101, is a parked vehicle 301, 302. The corresponding vehicle tires 303-306 of the vehicles 301, 302 appear very distorted in the image. Depending on the appearance of the distorted objects, it might be very difficult for the vehicle driver to identify the corresponding object in the displayed image. When the vehicle 101 is moving into or out of the parking space, the distortion additionally may be dynamically changing. This could additionally confuse the vehicle driver about the existence and actual dimensions of objects.

Figure 4:
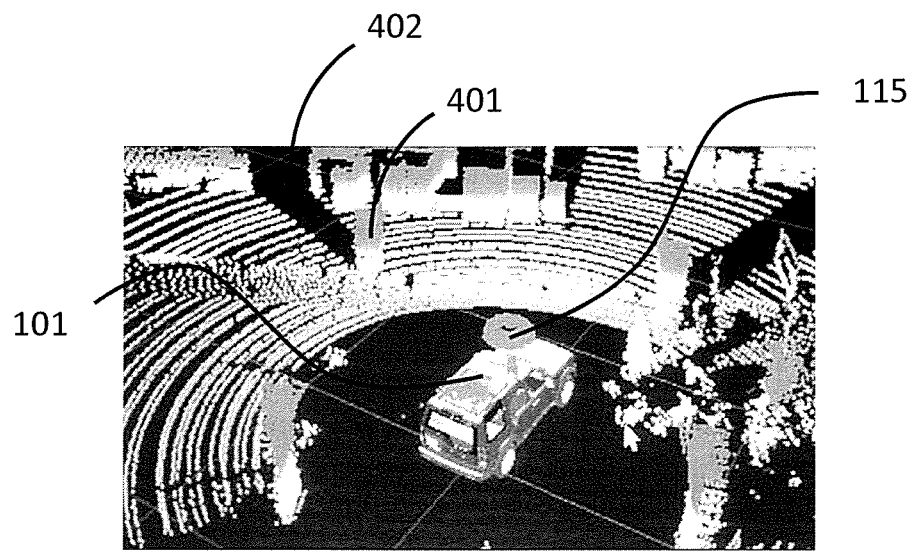
FIG. 4 shows a view on a LIDAR equipped vehicle illustrating a corresponding point cloud measured by the LIDAR.

FIG. 4 shows a view on a LIDAR 115 equipped vehicle 101 from an angle above the vehicle 101 illustrating a corresponding point cloud measured by the LIDAR sensor 115. The LIDAR 115 scans the surroundings of the vehicle 101, thereby measuring distances of objects 401 around the vehicle 101. Because of its physical nature, the sensor beam of the LIDAR 115 may not be able to detect the object situation behind an object 401. In the visualization of the point cloud as shown in FIG. 4, there may be a shadow 402 behind the object 401, when looking from the LIDAR sensor 115 to the object 402.

Figure 5:
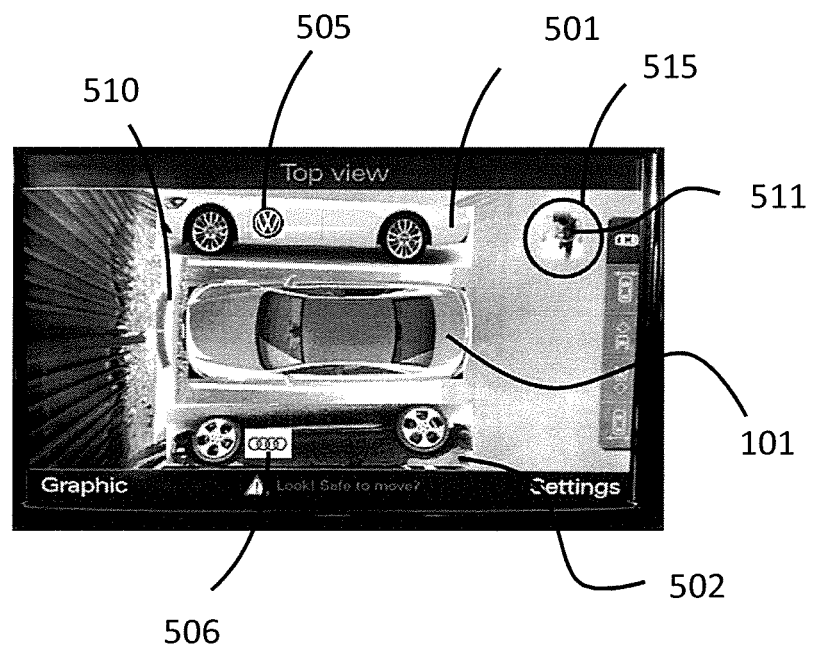
FIG. 5 shows an illustration of a birds-eye-view of the described driver assistance system displaying identified vehicles including the brand of the identified vehicles.

FIG. 5 shows an illustration of a birds-eye-view of the driver assistance system 100 displaying identified vehicles 501, 502 including the vehicle brand 505, 506 of the identified vehicles 501, 502. In one embodiment, when the vehicle 101 is approaching a parking space, a vehicle camera 110-114 picks up a vehicle brand and type of a vehicle parked in an adjacent parking space, e.g. the type could be Touareg, Golf, A4, A8 etc., and a brand name could be, for example Volkswagen or Audi. The image processor 130 may be configured to identify the names or logos of the vehicles 501, 502 in the captured images and stores the location of the identified vehicles 501, 502 in a memory (not shown). If the vehicle 101 proceeds to its parking space, the image processor 130 may be configured to display the type as well as the vehicle brand of adjacent identified vehicles 501, 502 on the display 150. The vehicle brands or types could also be displayed in their correct lettering or correct logo if the driver assistance system 100 comprises a databank in which the corresponding information may be stored. Alternatively, the driver assistance system 100 may be configured to connect to a remote server (not shown) providing access to a database. The link may be provided via a wireless data connection from which the driver assistance system 100 may be able to request and receive vehicle or object information. The driver assistance system 100 may either send out a specific request for a vehicle or manufacturer logo 505, 506 or, in another embodiment, send out at least one subimage of the captured images containing an image of a vehicle, an image partly showing a vehicle, a vehicle logo 505, 506 or a vehicle type. The remote server may then identify any vehicle logo 505, 506 and vehicle type in the subimage and send the information back to the requesting driver assistance system 100. In relation to the distance and location information, the driver assistance system 100 may display the vehicle type and vehicle brand logo 505, 506 in the displayed image on the identified vehicles 501, 502.

In another embodiment, a three dimensional graphical model or image of the identified vehicle 501, 502 may be received by the driver assistance system 100. The model or image may then be displayed at the correct position in the display 150. Additionally, curbs 510, poles or ditches can be highlighted on the display 150. These objects 401 have characteristic dimensions and shapes (height, elongation, predefined shape etc.), which can be detected by the image processor 130.

In the displayed image in FIG. 5, a person 515 may be walking alongside the parked vehicle 101. The person 515 may be highlighted in the image as a moving object 511. The highlighting can be done, for example, by circling the object 511 or by placing flashing graphical symbols on the object 511.

Figure 6A:
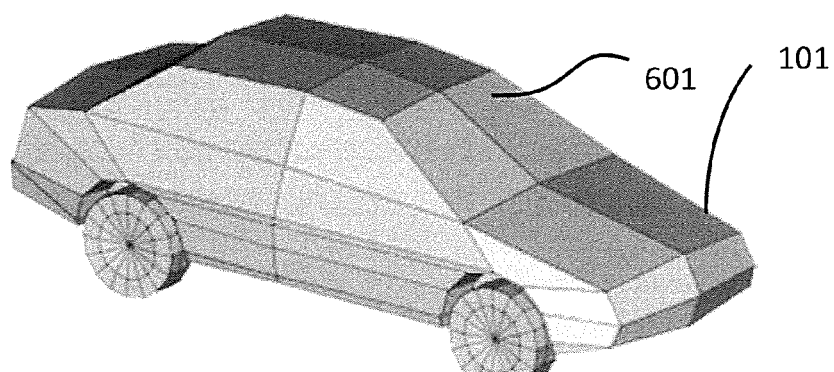
FIGS. 6a to 6c show perspective views on a mesh representing a vehicle with low (FIG. 6a), medium (FIG. 6b) and high (FIG. 6c) fineness of the mesh.
Figure 6B:
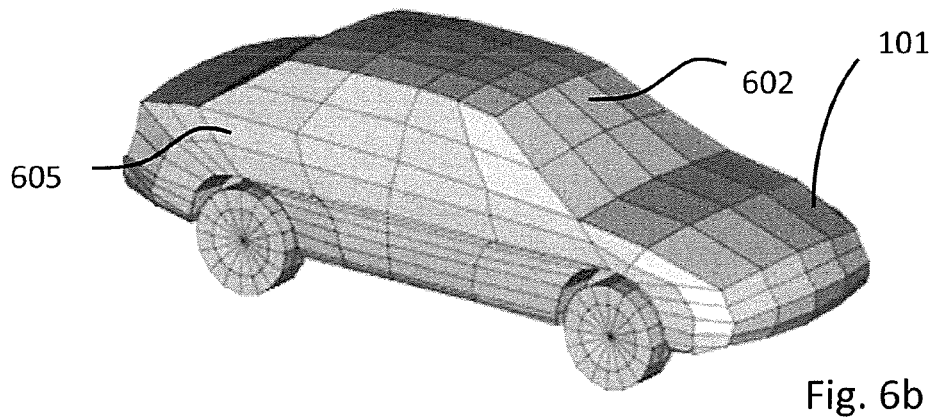
Figure 6C:
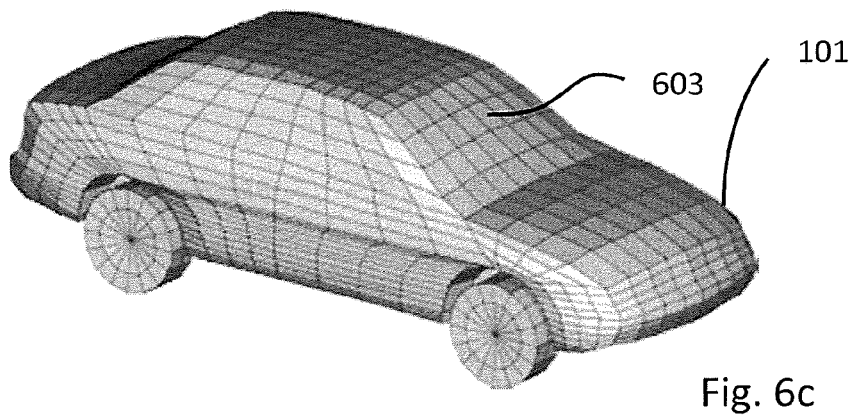

FIG. 6a-c show perspective views on a mesh representing a vehicle from a specific viewpoint with low (FIG. 6a), medium (FIG. 6b) and high (FIG. 6c) fineness of the mesh 601-603. In order to enhance the three dimensional appearance of objects, the landscape generator 118 creates a mesh on the detected objects 401, for example vehicles 501, 502 lamp posts, curbs 510, trash cans, and the like. First, the distance and shape of objects 401 may be measured by the at least one sensor 115. The landscape generator 118 may subsequently create a landscape of the surroundings of the vehicle 101 including any measured objects 401. The landscape generator 118 or the image mapper 119 creates a mesh 601-603 on the landscape, each mesh segment 605 having a space orientation. With the mesh 601-603 the shape of the landscape may be approximated by mesh segments 605. Depending on the complexity of the objects, the measuring resolution and the computing power, the fineness of the mesh 601-603 may be varied.

In one embodiment, the vehicle 101 may come to a stop in a parking position. The distance of an object 401 may be measured by the at least one sensor 115. The image processor 130 may process the measurement and image data to generate a first mesh 601 as shown in FIG. 6a. As described above, a first corresponding enhanced three dimensional image may be generated. On the vehicle display 150, a first viewpoint converted image with an enhanced three dimensional appearance, including a first fineness of the mesh 601, may be displayed. Depending on predefined setup parameters, which could include a value representing how good a mesh 601-603 approximates the landscape, a second mesh 602, especially in landscape areas with more complex shapes, may be generated. In a second iteration operation, the fineness of the mesh 601 may be enhanced leading to a second mesh 602 including more mesh segments 605, as shown in FIG. 6b. FIG. 6c shows a third mesh 603 with even higher fineness of the mesh 601-603. The approximation of the detected object 401 by mesh segments 605 is best in FIG. 6c.

By displaying the first image with a low mesh fineness, the vehicle driver may be able to get a first visual impression of the surroundings. This impression may be enhanced, the more iterations may be made.

Figure 7:
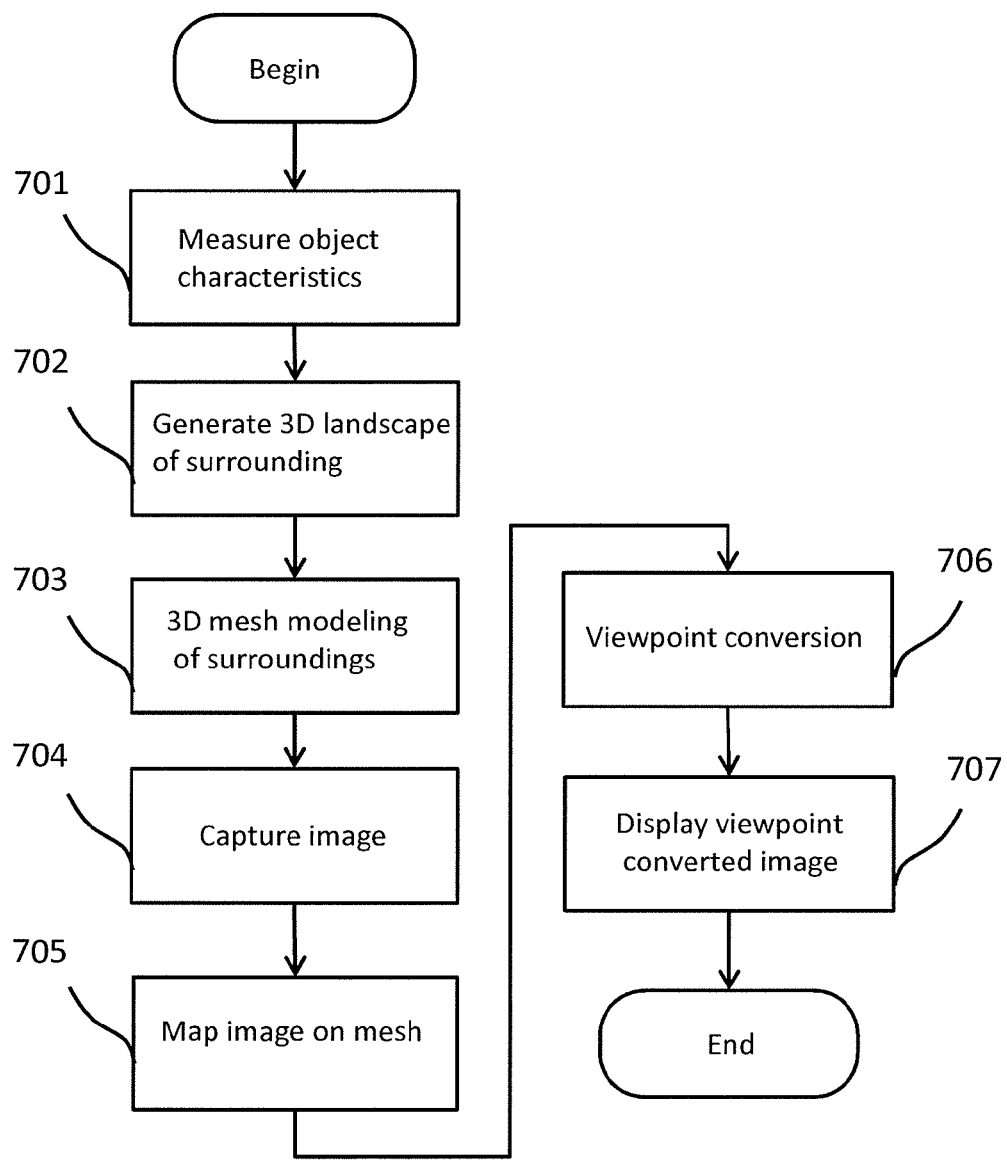
FIG. 7 shows a flow chart of the inventive method of assisting a driver to display on a vehicle display an image of corresponding surroundings of the vehicle.

FIG. 7 shows a flow chart of the inventive method of assisting a driver to display on a vehicle display an image of corresponding surroundings of the vehicle.

After the method is initialized, at 701, the distance of at least one object in surroundings of the vehicle may be measured. Various vehicle sensors could contribute to these measurements, like ultrasonic sensors, radar sensors, LIDAR sensors etc. At 702, a three dimensional landscape of surroundings may be generated by creating a surface that may be approximated by the different measurement points of the sensors. A three dimensional mesh may be generated at 703, which approximates the three dimensional landscape. The mesh 601-603 of FIGS. 6a-6c, as an example, can have different cell types, like triangle or quadrilateral and it can be a structured, unstructured or hybrid.

At 704, at least one image of the surroundings may be captured. If more than one camera captures images, overlapping image regions may be eliminated and an image combiner combines the images. A viewpoint converter transforms, at 706, the viewpoint of the single images either before combining or transforms the combined image to a desired viewpoint after the single images were combined. At 705, the combined image may be mapped on the mesh. Corresponding areas of the combined image may be mapped to the mesh or cell areas. The method may further display the viewpoint converted image on a display at 707.

All of the operations performed at 701-707 mentioned above can be processed in a different order or in parallel. For example, the measuring of objects at 701 can be processed together with the capturing images at 704. Also, for example, the combining of images, the viewpoint conversion, and the mapping on the mesh 601-603 could be executed as it would be economical in a specific hardware environment or in implementing the method in a computer executable program.

In one embodiment, curbs 510, ditches or poles may be highlighted in the viewpoint converted image on the display 150 in an additional step (not shown). It is of special help to the vehicle driver, if moving objects 511, like a walking person 515, will be highlighted in the displayed image. The highlighting provides important safety information to attract the vehicle driver's attention.

In one embodiment, the driver assistance system 100 comprises at least one user input device, for example, a touch-screen, a mouse, a trackball, a touchpad or a rotatable and swivel-mounted knob, etc., and the viewpoint converter may be configured to change the viewpoint and the viewing direction, including pan, tilt or zoom, on user inputs from the user input device. In this embodiment, the driver or any user can decide from which viewpoint and viewing direction he feels comfortable to safely guide the vehicle 101. For example, he might want to zoom to detected objects, like a pole and a curb 510. In one driving situation, he might want to tilt the viewpoint to the curb 510 to better park his vehicle 101 in a parking space. In another example, he might want to choose a different viewpoint and viewing direction on a corner when backing out of a parking space around this corner. In a further example, the driver modifies the viewpoint and viewing direction looking down at the rear of the vehicle 101, so that he can easily hitch a trailer to the vehicle 101. The additional option of changing the viewpoint and the viewing direction by the user further improves the acceptance and safety of the driver assistant system 100, because the driver can adapt the displayed image to his individual driving needs.

Although certain illustrative embodiments have been described in detail above, variations and modifications exist within the scope and spirit of this disclosure as described and as defined in the claims included in this application.

The invention claimed is:

1. A driver assistance system configured to display on a vehicle display an image of corresponding surroundings of a vehicle, the driver assistance system comprising:
   at least one image capturing camera configured to capture images of surroundings of a vehicle;
   a viewpoint converter configured to perform viewpoint conversion on the images to generate a viewpoint converted image having a point of view looking downwardly from above the vehicle;
   at least one sensor configured to detect a distance or a partial shape of at least one object in surroundings of the vehicle; and
   an image processor configured to modify the viewpoint converted image based on the detected distance or the partial shape of the at least one object looking from the vehicle to the at least one object, wherein the modification of the viewpoint converted image includes enhancing a three dimensional appearance of the at least one object in the viewpoint converted image,
   wherein the system is configured to enhance the three dimensional appearance of the viewpoint converted image by:
      generating a three dimensional landscape of at least a section of the vehicle surroundings based on the received sensor data; and
      mapping the viewpoint converted image on the generated three dimensional landscape,
   wherein the generating of the three dimensional landscape creates a mesh of detected objects in the vehicle surroundings, wherein the shape of the landscape is approximated by mesh areas, each mesh area having a space orientation that is taken into consideration when mapping images of the surrounding of the vehicle into the mesh areas.

2. The driver assistance system of claim 1, wherein the system is configured to highlight the at least one object if the detected distance is below a predefined threshold distance value.

3. The driver assistance system of claim 1, wherein the system is configured to highlight curbs, ditches or poles.

4. The driver assistance system of claim 1, wherein the system is configured to highlight moving objects.

5. The driver assistance system of claim 4, where the system is configured to highlight moving objects below a predetermined threshold distance value.

6. The driver assistance system of claim 1, wherein the at least one sensor includes one of a laser scanner, a radar sensor, an ultrasonic sensor.

7. The driver assistance system of claim 1, wherein the system is configured to identify a vehicle in a captured image and to identify the corresponding vehicle brand or type.

8. The driver assistance system of claim 7, wherein the system is configured to have access to an on- or off board image database of vehicles and to display an image of the identified vehicle in the viewpoint corrected image.

9. The driver assistance system of claim 1, wherein the viewpoint converter is configured to change the viewpoint based on the driving situation or the detected object data.

10. The driver assistance system of claim 1, wherein the driver assistance system comprises at least one user input device and the viewpoint converter is configured to change the viewpoint, pan, tilt or zoom, based on user inputs from the user input device.

11. A method of assisting a driver to display on a vehicle display an image of corresponding surroundings of the vehicle;
   capture at least one image of surroundings of the vehicle;
   convert the at least one image to another viewpoint having a view looking downwardly from above the vehicle;
   detect a distance of at least one object in surroundings of the vehicle with at least one sensor to determine the distance of an object; and
   modify the viewpoint converted image to enhance a three dimensional appearance of the at least one object in the viewpoint converted image,
   enhancing the three dimensional appearance of the viewpoint converted image by:
      generating a three dimensional landscape of at least a section of the vehicle surroundings based on the received sensor data; and
      mapping the viewpoint converted image on the generated three dimensional landscape,
   wherein the generating of the three dimensional landscape creates a mesh of detected objects in the vehicle surroundings, wherein the shape of the landscape is approximated by mesh areas, each mesh area having a space orientation that is taken into consideration when mapping images of the surrounding of the vehicle into the mesh areas.

12. The driver assistance system of claim 1, wherein the enhancement of the three dimensional appearance first creates a virtual map reflecting the measured distances of objects surrounding the vehicle and, then, creates a mesh on the surface of this virtual map comprising smaller mesh areas.

13. The driver assistance system of claim 12, wherein the size of the mesh areas depends on a curvature of the surface.

14. The driver assistance system of claim 12, wherein the size of the mesh areas are equal.

15. The driver assistance system of claim 12, wherein the size of the mesh areas is adjustable dynamically dependent on the curvature of the corresponding surface areas to be covered by the mesh.

16. The driver assistance system of claim 12, wherein after the mesh is created, all image portions are mapped into the mesh areas taking into consideration their corresponding space orientation.

17. The driver assistance system of claim 16, wherein the mapping of image portions into the mesh areas includes adjusting the viewpoint of the corresponding image portions to be mapped.

* * * * *